May 21, 1968  R. H. BENDER  3,384,523
METHOD AND APPARATUS FOR MAKING PROTECTIVE
BOOK COVERS AND THE LIKE
Filed Jan. 18, 1965  4 Sheets-Sheet 1

INVENTOR.
Raymond Henry Bender
BY
Popp and Sommer
ATTORNEYS

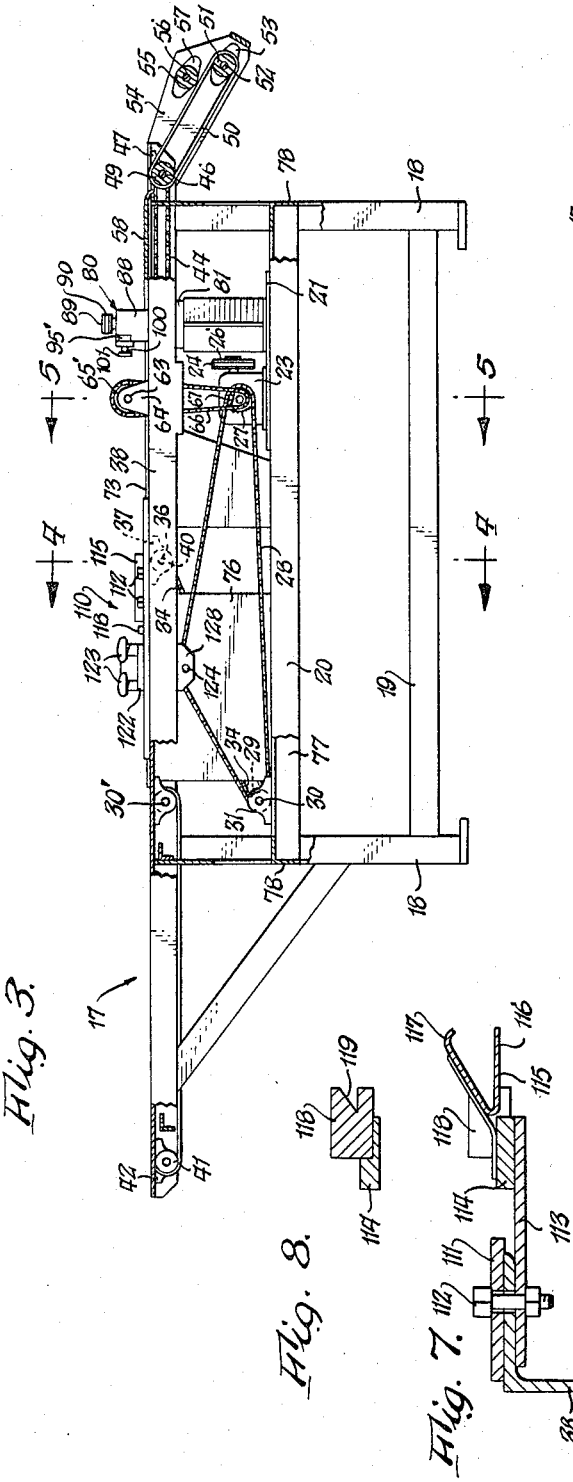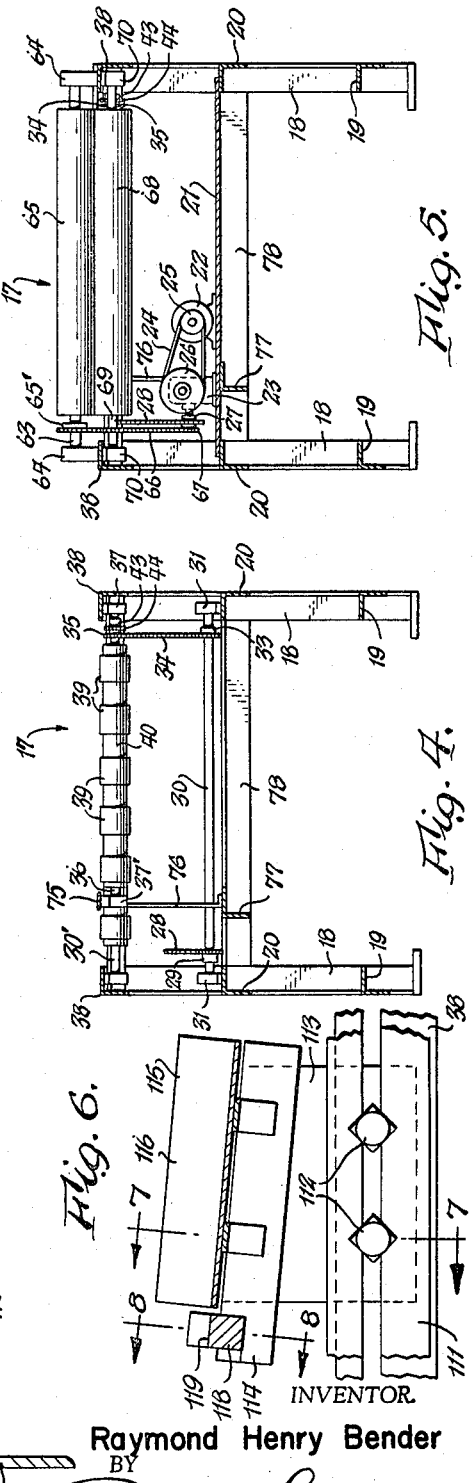

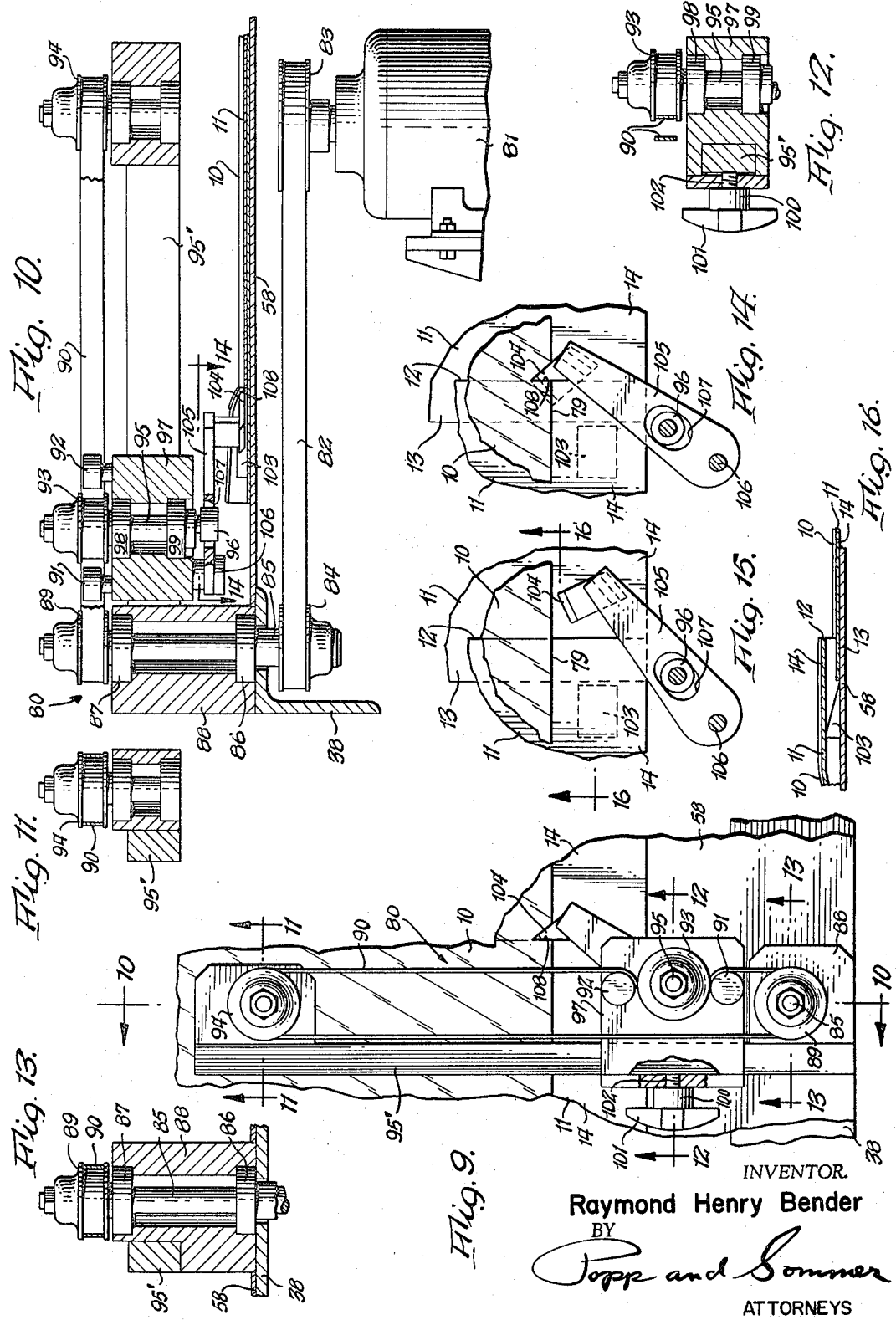

May 21, 1968  R. H. BENDER  3,384,523
METHOD AND APPARATUS FOR MAKING PROTECTIVE
BOOK COVERS AND THE LIKE
Filed Jan. 18, 1965  4 Sheets-Sheet 4
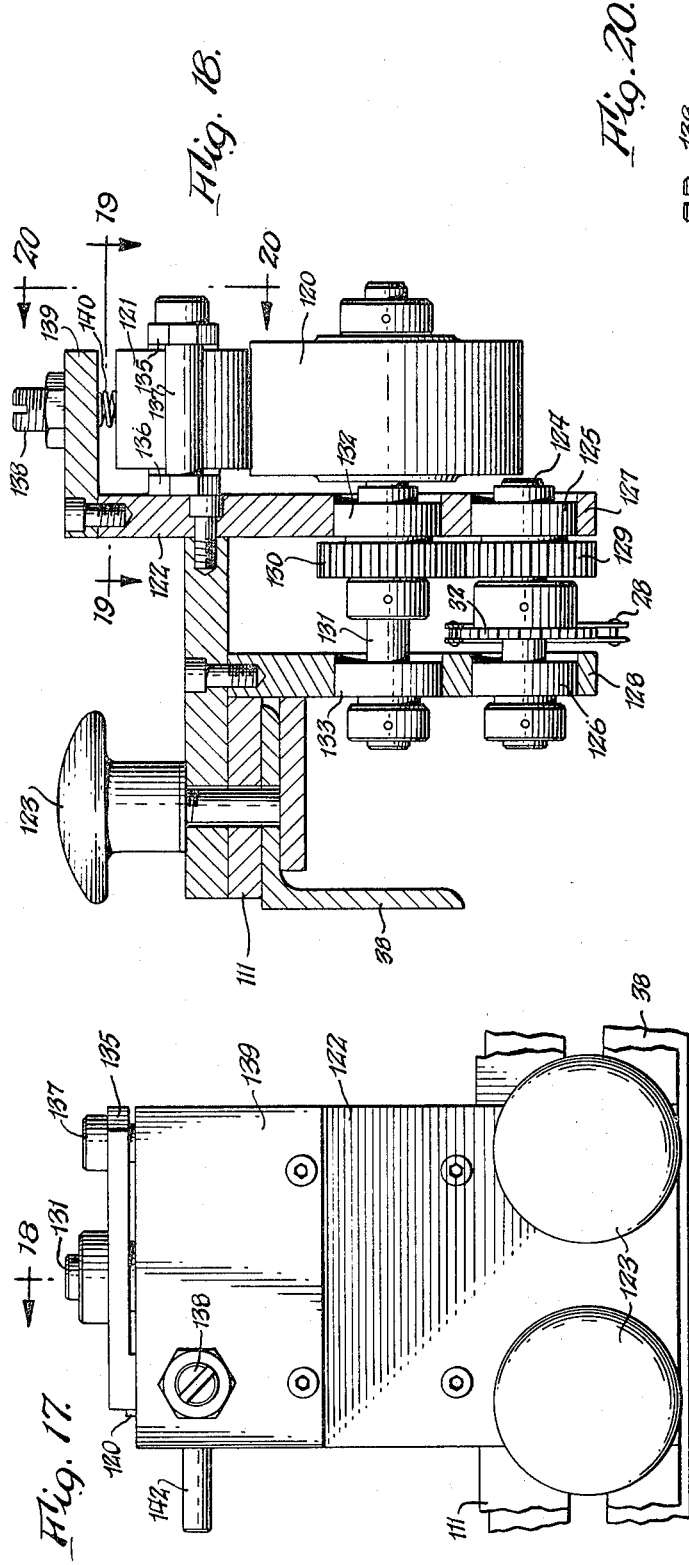
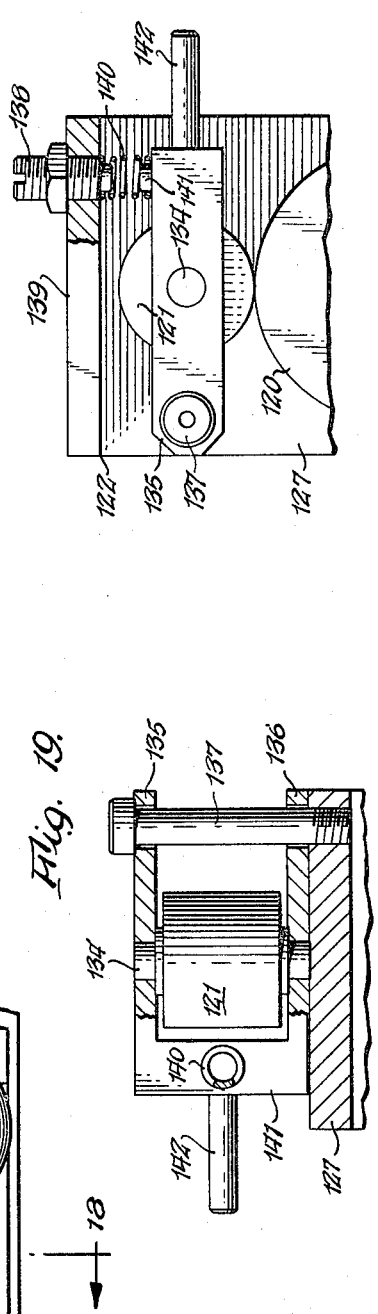
INVENTOR.
Raymond Henry Bender
BY Popp and Sommer
ATTORNEYS United States Patent Office 3,384,523
Patented May 21, 1968

3,384,523
METHOD AND APPARATUS FOR MAKING PROTECTIVE BOOK COVERS AND THE LIKE
Raymond Henry Bender, Tonawanda, N.Y., assignor to The Colad Company, Inc., Buffalo, N.Y., a corporation of New York
Filed Jan. 18, 1965, Ser. No. 426,043
16 Claims. (Cl. 156—269)

The present invention relates to a method and apparatus for making protective book covers and the like, and more particularly book covers of the sheet type adopted to be folded around books for the protection thereof, and, more particularly, to a method and apparatus for making laminated protective book covers including an outer clearly transparent layer or lamina which is smooth and glossy, has high tear strength and is highly resistive to moisture, scuffing and abrasion, and a base layer or lamina of high quality paper having high tear and burst strength and minimum hygroscopicity and on which can be printed school or fraternal insignia and advertisements as well as the guides for facilitating the application of the cover to different size books. The present invention is more particularly directed to an improved method and machine for separating a continuous strip of said clearly transparent layer or lamina containing a plurality of sheets of high quality paper cemented thereto into a plurality of separate book covers having the above mentioned characteristics.

It is one object of the present invention to provide a machine which rapidly, automatically and accurately severs a continuous strip of outer transparent protective-layer material having separate base layers of book cover paper cemented thereto into laminated book covers.

Another object of the present invention is to provide an improved method of manipulating a continuous strip of protective layer material associated with a laminated book cover having individual base layers mounted thereon so as to sever the continuous protective layer into a plurality of individual book covers consisting of the base layer and the protective layer cemented thereto. Other objects and attendant advantages of the present invention will be apparent from the following description and drawings in which:

FIGURE 3 is a side elevational view of the machine of FIGURE 1;

FIGURE 4 is a view taken substantially along line 4—4 of FIGURE 3 with certain portions omitted in the interest of clarity;

FIGURE 5 is a view taken substantially along line 5—5 of FIGURE 3 with certain portions of the latter being omitted in the interest of clarity;

FIGURE 6 is an enlarged detail view in plan of a portion of FIGURE 1 showing the guide mechanism for guiding a book cover during the process of separation thereof from the continuous strip of outer transparent layer material;

FIGURE 7 is a view taken substantially along line 7—7 of FIGURE 6 with certain portions omitted in the interest of clarity;

FIGURE 8 is a view taken substantially along line 8—8 of FIGURE 6;

FIGURE 9 is an enlarged plan detail view of a portion of FIGURE 1 showing certain of the mechanism for periodically actuating the knife which assists in the severing of the continuous strip of outer transparent layer material;

FIGURE 10 is a view taken substantially along line 10—10 of FIGURE 9;

FIGURE 11 is a view taken substantially along line 11—11 of FIGURE 9;

FIGURE 12 is a view taken substantially along line 12—12 of FIGURE 9;

FIGURE 13 is a view taken substantially along line 13—13 of FIGURE 9;

FIGURE 14 is a view of the knife, the lever on which it is mounted, and certain associated structure used in the process of cutting the outer transparent strip;

FIGURE 15 is a view similar to FIGURE 14 but showing the knife and its associated structure in a retracted position;

FIGURE 16 is a view taken substantially along line 16—16 of FIGURE 15 showing a wedge for acting on the base paper during the severing of the continuous outer strip;

FIGURE 17 is an enlarged plan detail view of a portion of the machine of FIGURE 1 which performs the tearing of a completed book cover from the continuous outer transparent strip after the cutting has been effected by the mechanism of FIG. 14;

FIGURE 18 is a view taken substantially along line 18—18 of FIGURE 17 and showing the mechanical drive and associated structure associated with the tearing structure;

FIGURE 19 is a view taken substantially along line 19—19 of FIGURE 18; and

FIGURE 20 is a view taken substantially along line 20—20 of FIGURE 18.

Figures 1, 2:
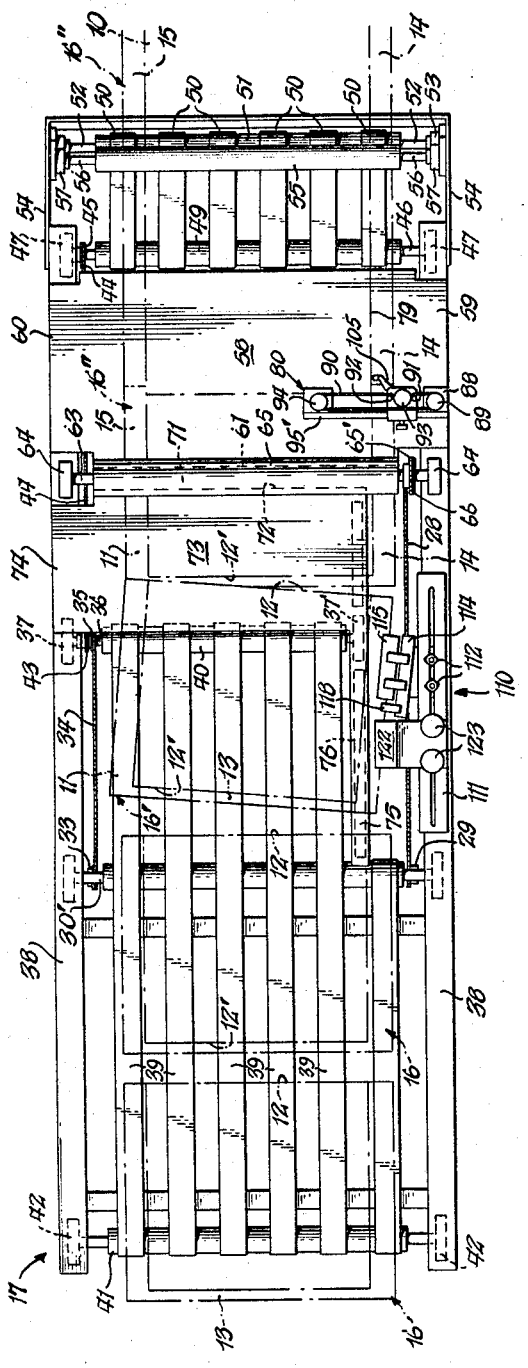
FIGURE 1 is a plan view of the improved machine of the present invention with a plurality of book covers shown in phantom in different states of processing.
FIGURE 2 is a plan view of a plurality of book covers occupying the same positions as those on the machine of FIG. 1, with those at the extreme right being joined together by the protective outer layer which is in strip form and those at the left being shown in their separated condition with one in the center being shown in the process of being separated.

In FIGURE 2 a continuous strip 10 of transparent film such as cellulose acetate is shown overlying a plurality of separate pieces of base paper 11 which are secured to said continuous strip by suitable adhesive. Each sheet 11 is secured to said strip by said adhesive up to trailing edge 12 and the leading edge portion 13 of each separate sheet 11 lies below, but is not secured to the trailing edge 12 of each preceding sheet. The continuous strip 10 is of less width than each of separate base pieces 11 and therefore the lateral edge portions 14 and 15 protrude beyond the contiguous lateral edges of strip 10. All portions of each separate base piece 11 except edge portions 13, 14 and 15 are cemented to strip 10.

At this point it is to be noted that separate base pieces 11 are made up of 70 pounds basis white kraft paper .005 inch thick, 13 inches wide and 20 inches long. The continuous strip 10 is a cellulose acetate film .00088 inch thick and 15¼ inches wide.

The reasons for orienting separate base pieces 11 on continuous strip 10 in the above described manner is to obtain a very thin line of continuous strip 10 between the trailing edge 12 of a leading sheet and the edge portion 12' of a trailing sheet edge portion 12' lying to the right of uncemented edge portion 13. More specifically, by having the above described overlapping relationship it is certain that there will be only a thin line of continuous strip 10 lying between edges 12 and 12'. Stated another way, it is virtually impossible to obtain a very narrow straight line of strip 10 between the leading and trailing edges of separate pieces 11 if an attempt were made to provide a butt joint therebetween rather than a lapped joint as shown. Therefore an uneven line would not be conducive to accurate tearing when strip 10 is severed in accordance with the present invention, as described in detail hereafter. Furthermore, the overlapping between the leading edge of a trailing sheet and a trailing edge of a leading sheet prevents the cement or adhesive joining sheets 11 to strip 10 from oozing out and causing the feed rollers to become sticky.

The two separated book covers 16 in the left of FIGURE 2 show book covers after they have been separated from the continuous strip 10 in accordance with the present invention. The book cover 16' at the center of FIGURE 2 is shown in the process of separation from strip 10 and book covers 16'' are shown while they are still completely secured to continuous strip 10. At this point it is to be noted that the separate base pieces 11 are cemented to continuous strip 10 at a station remote from the area at which each laminated book cover is separated from strip 10.

In FIGURE 1 the various book covers 16, 16' and 16'' in various stages of their separation are shown in phantom, in the same relationship as in FIG. 2, relative to the machine 17 which separates the laminated book covers from each other. The feed of the continuous strip 10 is effected into machine 17 from right to left in FIGURE 1. The machine includes a frame having a plurality of upstanding legs 18 (FIGURES 3, 4 and 5) made of angle irons with a pair of legs 18 on each side of the machine joined by horizontal angles 19. Upper horizontal angles 20 also join pairs of legs 18 on each side of the machine and also provide a support for shelf 21 which mounts motor 22 (FIG. 5) coupled to gear reducer 23 by belt 24, the latter encircling pulleys 25 and 26. A sprocket 27 on output shaft of gear reducer 23 is encircled by chain 28 which encircles sprocket 29 (FIGS. 3 and 4) keyed to shaft 30 (FIG. 4) having its opposite ends journalled in bearings 31 mounted on angles 20. In addition, chain 28 encircles sprocket 32 (FIG. 18) for reasons which will be explained in greater detail hereafter.

As can be seen from FIGURE 4 a sprocket 33 is also keyed to shaft 30 and is encircled by chain 34 which also encircles sprocket 35 keyed to shaft 36 journalled for rotation in bearing 37 secured to angle 38 and bearing 37' mounted on plate 76. A plurality of belts 39 encircle roller 40 mounted on shaft 36 and roller 41 journalled for rotation in bearings 42. Because of the foregoing linkage, the upper surfaces of belts 39 are caused to travel from right to left in FIGURE 1 to thereby convey separated book covers 16 from the separation zone which will be described in greater detail hereafter.

A sprocket 43 is also keyed to shaft 36 and is encircled by chain 44 (FIGS. 1 and 3) which also encircle sprocket 45 (FIG. 1) keyed to shaft 46 journalled in the bearings 47 mounted on angles 38. A roller 49 is keyed to shaft 46 and is encircled by belts 50 which also encircle roller 51 mounted on shaft 52 having its opposite ends journalled in bearings 53 mounted on plates 54 secured to the right ends of angles 38, as by welding. An idler roller 55 is mounted on shaft 56 having its opposite ends journalled in bearings 57 also mounted on plates 54.

The continuous strip 10 is fed between roller 55 and belts 50 and is thus caused to travel from right to left in FIGURES 1 and 3. The continuous strip 10 with separate book cover pieces 11 affixed to the underside thereof in the above described manner then passes onto plate 58 having its opposite ends 59 and 60 secured to angles 38. The left end of plate 58 terminates at edge 61 (FIG. 1) underlying roller 65 mounted on shaft 63 having its opposite ends journalled in bearings 64 carried by angles 38. A sprocket 65' mounted on shaft 63 is encircled by chain 66 (FIG. 5) which also encircles sprocket 67 driven by the output of gear reducer 23.

As can be seen from FIGURE 5 a roller 68 underlies roller 65 and is mounted on shaft 69 having its opposite ends journalled in bearings 70 secured to angles 38. Rollers 65 and 68 are in contact with each other to grip strip 10 and the attached separate pieces of book cover paper 11 and feed them from right to left in FIGURE 1. It is to be noted that the foregoing gripping action of rollers 65 and 68 is provided through slot 71 (FIGURE 1) lying between the edge 61 of plate 58 and the edge 72 of plate 73 having its outer edge 74 secured to one of angles 38 and its outer edge 75 (FIGS. 1 and 4) secured to plate 76 extending upwardly and attached to angle 77 (FIGURE 4) extending between cross brace angles 78 which in turn extend across angles 20. At this point it is to be noted from FIGURE 1 that edge 75 is an elongated narrow member which extends between shafts 30' and at the latter point merges into top plate 73 which extends substantially across the entire width of the machine shown in FIGURE 1.

It is between the point at which continuous strip 10 enters plate 58 and leaves plate 73 in FIGURE 1 that it is severed to provide the individual laminated book covers 16. It is while continuous strip 10 passes across plate 58 and prior to the time that it enters between feed rollers 65 and 68 that the lateral edge 79 of continuous strip 10 adjacent lateral edges 14 of separate pieces 11 and in the vicinity of transverse edges 12 and 12' is cut by cutting mechanism 80 (FIGURES 1, 3, 9, 10, 11, 12, 13, 14, 15 and 16). The cutting mechanism 80 includes a motor 81 (FIG. 10) mounted on shelf 21 (FIG. 3). A belt 82 encircles pulley 83 driven by motor 81 and also encircles pulley 84 mounted on shaft 85 journalled in bearings 86 and 87 mounted in housing 88 secured to angle 38. The end of shaft 85 remote from pulley 84 mounts a pulley 89 which is encircled by belt 90 which also passes around pressure rollers 91 and 92 (FIG. 9), pulley 93 and idler pulley 94, all mounted on arm 95' extending in cantilevered relationship from housing 88 (FIG. 10). Rollers 91 and 92 bias belt 90 into engagement with said pulley 93 which is mounted on shaft 95 and in turn carries disc 96 eccentrically mounted on the lower end thereof, shaft 95 being journalled in housing 97 by bearings 98 and 99. The driving of belt 90 will cause rotation of shaft 95 with corresponding orbital movement of eccentrically mounted disc 96 which is received in slot 107 of arm 105, with knife 104 carried at one end of arm 105 and the other end being pivotally supported on pin 106. It can thus be seen that rotation of shaft 95 will cause arm 105 to oscillate back and forth between the positions shown in FIGURES 14 and 15. It is to be noted from FIGURES 9 and 12 that cantilevered arm 95' extends through housing 97 and a set screw 100 having a knob 101 is provided with a threaded portion 102 (FIG. 12) extending into engagement with arm 95' to permit block 97 to be moved back and forth on arm 95' (see FIG. 9) when screw 100 is loose, to adjust the position of said block and the knife 104 carried thereby to accommodate various widths of strip 10 to be cut.

In order to effect cutting of the lateral edge 79 of strip 10 the following occurs. First of all it is to be noted that motor 81 causes arm 105 to oscillate with an extremely high frequency so that it moves in toward lateral edge 79 at extremely small increments of its longitudinal travel. As can be seen from FIGURES 14, 15 and 16 a wedge shaped block 103 is positioned on plate 58 so that the lateral edge 14 of each individual base piece 11 passes over and is lifted by said block 103. However block 103 does not underlie lateral edge 79 of continuous strip 10 (see FIGURES 14 and 15). So long as a leading or central portion of each base piece 14 is on block 103 the portions of the lateral edge 14 both fore and aft of block 103 will pull strip 10 down sufficiently so that oscillating knife 104 passes above and does not come in contact with lateral edge 79. However, as can be seen from FIGURE 16, when block 103 is located proximate the trailing edge 12 of a base piece 11 the natural resiliency of piece 11 will cause trailing edge 12 to tend to be biased upwardly and with it the portion of lateral edge 79 will be biased upwardly to an elevation which is higher than the portions of lateral edge 79 proximate the more centrally located portions of edge 14. When the trailing edge 12 and lateral edge 79 of strip 10 are elevated slightly higher, knife 104 will effect a cut in the general area of trailing edge 12. As can be noted from FIGURE 16 the foregoing lifting action occurs while the lateral edge 14 of a leading piece 11 is supported by block 103 and before the leading edge 13 of a trailing piece reaches block 103. Because of the foregoing action, cuts 108 are made in strip 10 in the vicinity of trailing edges 12 of each piece 11.

After the edge of continuous strip 10 has been cut in the above described manner by the action of knife 104, continuous strip 10 will move from right to left at a first predetermined speed through rollers 65 and 68 (FIG. 1) and onto plate 73, described above. Continued movement will cause the left edge 14 of separate base piece 11 to approach tearing station 110 (FIGS. 1, 3, 6, 7, 8, 17, 18, 19 and 20). As can be seen from FIGS. 1 and 6, 7 and 8 an elongated plate 111 is mounted on angle 38 by nuts and bolts 112 extending through alined apertures in plate 111, angle 38 and plate 113 (FIG. 7). The latter in turn mounts a block 114 in turn carrying guide 115 having a horizontal leg 116 and upwardly inclined leg 117 meeting at an apex. As can be seen from FIGURE 1, guide 115 extends at an angle to the longitudinal direction of travel of strip 10 through rollers 65 and 68. Therefore the leading portion of edge 14 of the separate base piece 11 will enter guide 115 and will be deflected upwardly in FIGURE 1 to therefore tend to travel in the direction shown. Guide 115 is made of steel but since the paper is relatively tough this steel will tend to be worn through. Therefore a block 118 which may be made of carbide or other suitable material having a notch 119 therein (FIG. 8) is placed in advance of guide 115 so that the edge 14 of the book cover will bear against it and thus block 118 will relieve the loading from guide 115. The changing of direction of travel of the base piece 11 of the book cover will tend to cause the previously made cut 108 to become somewhat enlarged, as can be seen from FIGURE 1. However, this mere change in travel by itself will not be effective to sever a book cover 16' consisting of a base paper 11 and the portion of continuous strip 10 from the remainder of continuous strip 10.

To effect the final tearing the edge 14 of base piece 11 enters between rollers 120 (FIG. 18) and 121 mounted on frame 122 which in turn is mounted on plate 111 by manual actuatable screws 123. More specifically, chain 28 (FIG. 3) encircles sprocket 32 (FIGS. 3 and 18) keyed to shaft 124 having its ends journalled in bearings 125 and 126 mounted in sides 127 and 128 of housing 122, respectively. Shaft 124 has a gear 129 keyed thereon which is in mesh with gear 130 keyed to shaft 131 journalled in bearings 132 and 133 mounted in sides 127 and 128 of housing 122, respectively. Shaft 131 also has roller 120 mounted thereon and thus drives the latter. An idler roller 121 is mounted for rotation on shaft 134 having its opposite ends mounted in arms 135 and 136 which are pivotally mounted on shaft 137 extending from plate 127. A screw 138 extends through plate 139 and bears on one end of spring 140, the other end of which bears on member 141 (FIG. 19). Spring 140 biases roller 121 downwardly into engagement with roller 120 by virtue of the fact that arms 136 and 135 are connected by cross member 141 (FIG. 19) and said arms pivot about shaft 137. A handle 142 is provided on cross arm 141 for biasing roller 121 into engagement with roller 120 manually. It will be noted at this time that the gearing arrangement is such that rollers 120 and 121 have a second predetermined linear peripheral speed which is in excess of the rate of travel of continuous strip 10 through rollers 65 and 68 at said first predetermined speed. Therefore, as partly separated book covers 16' (FIG. 1) is engaged by rollers 120 and 121, the edge 14 of the separate base piece of the book cover will be speeded up faster than the rate of travel of the immediately following separate piece 16", and thus slit 108 will be caused to enlarge and form a tear completely separating book cover 16' from the remainder of continuous strip 10 by virtue of causing a tearing action across the entire width of the continuous strip.

It is to be noted at this time that the continuous strip 10 tears substantially along the trailing edge 12 of the laminated book cover 16, because of the fact that the trailing edge 12 is of double thickness, namely, it includes a thickness of the separate base piece 11 and a thickness of continuous strip 10 cemented thereto. In addition, the next book cover has a cemented edge 12' (FIGS. 1 and 2) adjacent the overlapping edge 13. Thus there is a single thickness of continuous strip material 10 between edges 12 and 12' and it is therefore along this path of least resistance that the tear occurs.

The above described action is applied to each book cover and after each book cover 16' is completely severed from continuous strip 10 so that it forms a separate book cover 16 shown in FIGURES 1 and 2, the conveyor consisting of belts 39 carries such book covers away from station 110.

The instant machine is capable of producing approximately 6,000 book covers per hour in a rapid automatic and efficient manner by virtue of the combined action of all of the above enumerated components and by the practicing of the instant method.

While preferred embodiments of the present invention have been disclosed it will readily be understood that the present invention is not to be limited thereto but may be otherwise embodied within the scope of the following claims.

I claim:
1. The method of making laminated protective book covers and the like having a base layer and an outer protective layer cemented thereto comprising the steps of providing a continuous strip of material forming said outer protective layer with a plurality of separate pieces forming the base layer of each protective book cover cemented in progression on said strip with the leading edge of each of said separate pieces lying loosely in overlapping relationship with the trailing edge of an adjacent separate piece cemented to said strip, advancing said strip with a first predetermined speed, lifting the trailing edge of each separate piece during the travel of said outer strip, cutting the edge of said strip to provide a cut therein proximate the area of overlapping between said trailing edge of a leading separate piece and said leading edge of a following separate piece, accelerating said strip in advance of said cut to a second predetermined speed which is greater than said first predetermined speed to thereby cause said outer layer to tear along a line substantially coinciding with said cemented trailing edge of said leading separate piece to thereby sever said leading separate piece with a portion of said outer protective layer cemented thereto from said continuous strip.

2. The method of making laminated protective book covers and the like as set forth in claim 1 including the step of changing the direction of said continuous strip in advance of said cut to separate the sides of said cut during said acceleration to thereby facilitate the severing of said laminated book cover from said continuous strip.

3. The method of making laminated protective book covers and the like having a base layer and an outer protective layer cemented thereto comprising the steps of providing a continuous strip of material forming said outer protective layer which is of less width than each of a plurality of separate pieces forming the base layer of each protective book cover, with each of said separate pieces cemented in progression on said strip with the leading edge of each of said separate pieces lying loosely in overlapping relationship with the trailing edge of an adjacent separate piece cemented to said strip, said trailing edge of each of said separate pieces lying in transverse relationship to the length of said strip, each of said separate pieces having a lateral edge portion which extends beyond the adjacent edge portion of said strip by virtue of the fact that said separate pieces are wider than said strip, advancing said strip with a first predetermined speed, lifting the attached trailing edge of each separate piece in sequence during the travel of said strip, cutting the edge of said strip while said trailing edge is lifted to provide a cut therein proximate the area of overlapping between said leading edge of a trailing separate piece and the trailing edge of a leading separate piece, accelerating the edge of said separate piece in advance of said cut to a second predetermined speed which is greater than said first predetermined speed to thereby cause said strip to tear along a line substantially coinciding with said cemented trailing edge of said leading separate piece to thereby sever said leading separate piece with a portion of said outer protective layer cemented thereto from said continuous strip to thereby form a separate laminated book cover.

4. The method of making laminated protective book covers and the like as set forth in claim 3 including the steps of changing the direction of said continuous strip in advance of said cut to thereby separate the sides of said cut during said acceleration to thereby facilitate the severing of said laminated book cover from said continuous strip.

5. A machine for making laminated protective book covers and the like each having a base layer and an outer protective layer cemented thereto from a continuous strip of material comprising said outer protective layer with individual separate pieces of base layer material cemented thereto, with said individual separate pieces of said base layer being wider than said continuous strip and having lateral edge portions extending beyond an adjacent lateral edge portion of said continuous strip, and certain portions of said separate pieces being cemented to said strip in progression with adjacent edges of each separate piece extending transversely to the direction of movement of said strip and lying in overlapping relationship with each other, comprising means for feeding said continuous strip at a first speed in the direction of its longitudinal axis, cutting means for cutting an edge portion of said continuous strip in the area of said transversely extending edge portions of said separate pieces, means for moving a portion of said continuous strip proximate said transversely extending edge portions into engagement with said cutting means to thereby produce a cut proximate said transversely extending edge portions, and means for accelerating one of said separate pieces in advance of said cut to a second speed which is greater than said first speed to thereby cause said strip to tear substantially along said adjacent edges of said separate pieces.

6. A machine for making laminated protective book covers and the like each having a base layer and an outer protective layer cemented thereto, said book covers being made from a continuous strip of material comprising said outer protective layer with individual separate pieces of base layer material cemented thereto with said individual separate pieces of said base layer being wider than said continuous strip and having edge portions extending beyond an adjacent edge portion of said continuous strip and said separate pieces being cemented to said strip in progression with the leading edge of each piece lying loosely in overlapping relationship with the trailing edge of an adjacent separate piece cemented to said strip and with the trailing edges of each of said separate pieces extending transversely to the length of said continuous strip of outer protective layer material comprising means for feeding said continuous strip at a first speed in the direction of its longitudinal axis, means for cutting an edge portion of said continuous strip in the area of said trailing edge portion of said leading separate piece, and means for accelerating said leading separate piece in advance of said cut to a second speed which is greater than said first speed to thereby cause said strip to tear substantially along said trailing edge of said leading piece.

7. A machine for making laminated protective book covers and the like as set forth in claim 6 including means for changing the direction of said leading separate piece after the cutting thereof to thereby separate the sides of said cut and thereby enhance the tearing of said continuous strip when said leading separate piece is accelerated to said second speed.

8. A machine for making laminated protective book covers and the like as set forth in claim 6 including means for conveying a laminated book cover separated from said strip away from the area of separation.

9. A machine for making laminated book covers and the like each having a base layer and an outer protective layer cemented thereto, said book covers being made from a continuous strip of material comprising said outer protective layer with individual separate pieces of base layer material cemented thereto with said individual separate pieces of said base layer being wider than said continuous strip and having lateral edge portions extending beyond an adjacent lateral edge portion of said continuous strip and said separate pieces being cemented to said strip in progression with the continuous strip lying on top of said separate pieces and each of said separate pieces having a leading edge lying closely in overlapping relationship with the trailing edge of an adjacent separate piece and with the trailing edges of each of said separate pieces being cemented to and extending transversely to the length of said continuous strip: comprising means for feeding said continuous strip through a part of said machine at a first predetermined speed, wedge means for lifting said trailing edge of each of said separate pieces along the lateral edge portion thereof when it reaches a predetermined point in its travel through said machine, cutting means operable in synchronism with the lifting action of said wedge means to cut the lateral edge of said continuous strip proximate the juncture of said leading and lifted trailing edges of adjacent separate pieces, guide means for engaging the laterally extending edge portion of each of said separate pieces in advance of said cut for deflecting said lateral edge portion laterally and thereby tending to separate the sides of said cut, and roller means for engaging said laterally extending edge portion in advance of said cut and causing said laterally extending edge portion to travel at a second predetermined speed in excess of said first predetermined speed to thereby cause said continuous strip to tear along a line substantially coinciding with the trailing edge of said separate piece.

10. A machine for making laminated book covers and the like as set forth in claim 9 including means for varying the position of said cutting means to accommodate continuous strips of different widths.

11. A machine for making laminated book covers and the like as set forth in claim 10 wherein said guide means includes a hardened highly wear resistant element.

12. A machine for making laminated book covers and the like as set forth in claim 11 including means for adjusting the position of said rollers.

13. A machine for making laminated book covers and the like each having a base layer and an outer protective layer cemented thereto, said book covers being made from a continuous strip of material comprising said outer protective layer with individual separate pieces of base layer material cemented thereto with said individual separate pieces of said base layer being wider than said continuous strip and having lateral edge portions extending beyond an adjacent lateral edge portion of said continuous strip and said separate pieces being cemented to said strip in progression with the continuous strip lying on top of said separate pieces and each of said separate pieces having a leading edge lying loosely and closely in overlapping relationship with the trailing edges of an adjacent separate piece and with the trailing edge of each of said separate pieces being cemented to and extending transversely to the length of said continuous strip: comprising a base member, first conveyor means on said base member for feeding said strip, a cutting station including wedge means for lifting said trailing edge of each of said separate pieces along the lateral edge portion thereof when it reaches a predetermined point in its travel through said machine, cutting means including an oscillatable knife operable to cut the lateral edge of said continuous strip proximate the juncture of said leading and lifted trailing edges of adjacent separate pieces, roller means for advancing said continuous strip after the operation of said cutting means, guide means on said base member for engaging the laterally extending edge portion of each of said separate pieces in advance of said cut for deflecting said lateral edge portion laterally and thereby tending to separate the sides of said cut, second roller means for engaging said laterally extending edge portion in advance of said cut and causing said laterally extending edge portion to travel at a second predetermined speed in excess of said first predetermined speed to thereby cause said continuous strip to tear along the line substantially coinciding with the trailing edge of said separate piece, and second conveyor means located proximate said second roller means for conveying a separated laminated book cover away from said roller means after said book cover has been separated from said continuous strip.

14. A machine for making laminated book covers and the like each having a base layer and an outer protective layer cemented thereto, said book covers being made from a continuous strip of material comprising said outer protective layer with individual separate pieces of base layer material cemented thereto with said individual separate pieces of said base layer being wider than said continuous strip and having lateral edge portions extending beyond an adjacent lateral edge portion of said continuous strip and said separate pieces being cemented to said strip in progression with the continuous strip lying on top of said separate pieces and each of said separate pieces having a leading edge lying loosely and closely in overlapping relationship with the trailing edge of an adjacent separate piece and with the trailing edges of each of said separate pieces being cemented to and extending transversely to the length of said continuous strip: comprising means for feeding said continuous strip through a part of said machine at a first predetermined speed, knife means mounted on said machine, means for oscillating said knife means above said continuous strip at a rate which causes said knife to pass toward and away from said strip during small increments of strip travel, means for selectively raising said strip in the area of said cemented trailing edge of each separate piece to thereby cause said continuous strip to move into contact with said knife means proximate said trailing edge of said separate piece to thereby cut the edge of said continuous strip in the vicinity of said trailing edge, and means for accelerating said continuous strip to a second predetermined speed which is greater than said first predetermined speed in advance of said means for feeding said strip at said first predetermined speed while the portion of said continuous strip behind said cut continues to travel at said first predetermined speed to thereby cause said continuous strip to tear along a line substantially coinciding with the trailing edge of said separate piece.

15. A machine for making laminated book covers and the like each having a base layer and an outer protective layer cemented thereto, said book covers being made from a continuous strip of material which forms said outer protective layer with individual separate pieces of base layer material cemented thereto in progression and with adjacent transverse edges of said separate pieces lying in overlapping relationship with the transverse edge of one of said pieces being cemented to said continuous strip and the adjacent transverse edge of the other piece lying loosely thereover: comprising means for feeding said continuous strip through a part of said machine at a first predetermined speed, knife means on said machine, means for oscillating said knife means next to said continuous strip at a rate which causes said knife means to pass toward and away from said continuous strip during small increments of strip travel, means for selectively changing the elevation of said strip in the area of said cemented edge of said separate piece to thereby cause said continuous strip to move into contact with said knife means to thereby cut the edge of said continuous strip in the vicinity of said cemented edge, and means for accelerating said continuous strip to a second predetermined speed which is greater than said first predetermined speed in advance of said cut while the portion of said continuous strip behind said cut continues to travel at said first predetermined speed to thereby cause said continuous strip to tear along a line substantially coinciding with said cemented edge.

16. A machine for making laminated book covers and the like each having a base layer and an outer protective layer cemented thereto, said book covers being made from a continuous strip of material which forms said outer protective layer with individual separate pieces of base layer material cemented thereto in progression and with adjacent transverse edges of said separate pieces lying in overlapping relationship with the transverse edge of one of said pieces being cemented to said continuous strip and the adjacent transverse edge of the other piece lying loosely thereover: comprising means for feeding said continuous strip through a part of said machine at a first predetermined speed, knife means on said machine, means for causing said knife means to engage the edge of said continuous strip proximate said cemented edge to thereby cut said edge of said continuous strip, and means for accelerating said continuous strip to a second predetermined speed which is greater than said first predetermined speed in advance of said cut while the portion of said continuous strip behind said cut continues to travel at said first predetermined speed to thereby cause said continuous strip to tear along a line substantially coinciding with said cemented edge.

References Cited

UNITED STATES PATENTS

| | | | |
|---|---|---|---|
| 2,956,484 | 10/1960 | Subklew | 93—61 |
| 3,122,292 | 2/1964 | Ford et al. | 225—2 |
| 3,279,970 | 10/1966 | Foukal | 156—270 |

EARL M. BERGERT, *Primary Examiner.*

M. L. KATZ, *Examiner.*